(12) United States Patent
Havel

(10) Patent No.: US 6,321,712 B1
(45) Date of Patent: Nov. 27, 2001

(54) RACING ENGINE HAVING TRIMETAL BEARINGS WITH A THICK OVERLAY FOR HIGH SPEED AND/OR HIGH LOAD APPLICATIONS

(75) Inventor: John F. Havel, Grass Lake, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/563,890

(22) Filed: May 3, 2000

Related U.S. Application Data
(60) Provisional application No. 60/195,674, filed on Apr. 7, 2000.

(51) Int. Cl.[7] .............................. F02B 77/00; F16C 9/02
(52) U.S. Cl. .............................. 123/197.4; 123/198 DA; 389/288; 389/294
(58) Field of Search .............................. 384/42, 268, 270, 384/430, 288, 294; 123/198 DA, 197.3, 197.4

(56) References Cited

U.S. PATENT DOCUMENTS

| | | | |
|---|---|---|---|
| 2,500,206 | 3/1950 | Schaefer et al. | 204/297 |
| 4,072,368 | * 2/1978 | Ehrentraut | 384/295 |
| 4,188,079 | * 2/1980 | Mori | 384/294 |
| 4,545,913 | 10/1985 | Mahrus et al. | 252/12.6 |
| 4,553,856 | 11/1985 | Bierlein et al. | 384/276 |
| 4,562,122 | 12/1985 | Hodes et al. | 428/644 |
| 4,877,696 | * 10/1989 | Muto | 428/645 |
| 4,889,772 | * 12/1989 | Bergmann et al. | 428/547 |
| 4,999,257 | * 3/1991 | Imai | 428/555 |
| 5,056,936 | 10/1991 | Mahrus et al. | 384/276 |
| 5,156,729 | 10/1992 | Mahrus et al. | 205/104 |
| 5,601,371 | * 2/1997 | Koroschetz et al. | 384/276 |
| 5,707,155 | 1/1998 | Banfield et al. | 384/295 |
| 5,803,614 | * 9/1998 | Tsuji et al. | 384/276 |
| 5,882,587 | 3/1999 | Okamoto et al. | 420/570 |
| 5,911,513 | * 6/1999 | Tsuji et al. | 384/276 |
| 6,000,853 | 12/1999 | Lytwynec et al. | 384/294 |
| 6,120,187 | * 9/2000 | Ono et al. | 384/273 |
| 6,139,191 | * 10/2000 | Andler et al. | 384/276 |
| 6,146,019 | * 11/2000 | Andler et al. | 384/276 |
| 6,178,639 | * 1/2001 | Lytwynec et al. | 29/898.047 |

OTHER PUBLICATIONS

"Pleated Overlays on Sleave Bearings", Clevite Corporation, front cover, index, pp. 1–16, rear cover.
"Engine Bearing Materials" Glacier Vandervell, coversheet, pp. 1–5.

* cited by examiner

*Primary Examiner*—Willis R. Wolfe
*Assistant Examiner*—Hai Huynh
(74) *Attorney, Agent, or Firm*—Dykema Gossett PLLC

(57) ABSTRACT

A racing engine is provided for use in extremely high speed and/or high load applications such as drag racing. The engine includes an engine block and a crankshaft disposed within the engine block. The engine also includes a bearing disposed about and rotatably journalling the crankshaft. The bearing is of the trimetal type and has a steel backing layer, an intermediate layer, and an overlay layer. In accordance with the present invention, the overlay layer has a thickness of at least 38 μm (0.0015 inches), and preferably about 51 μm (0.002 inches).

14 Claims, 2 Drawing Sheets

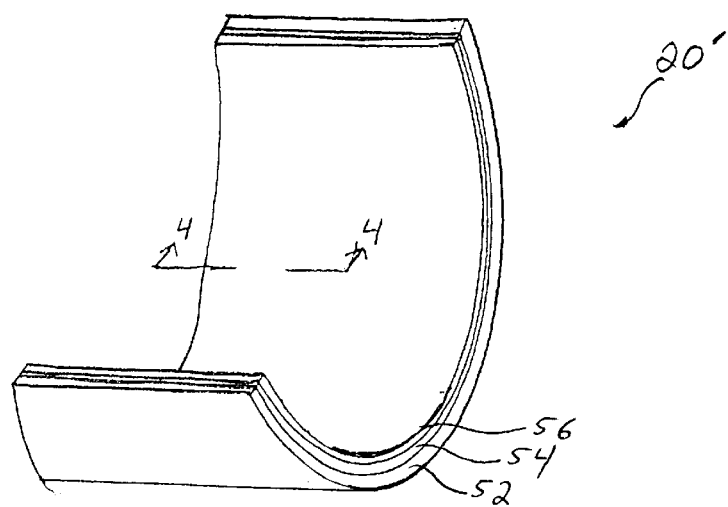
FIG. 3
FIG. 4
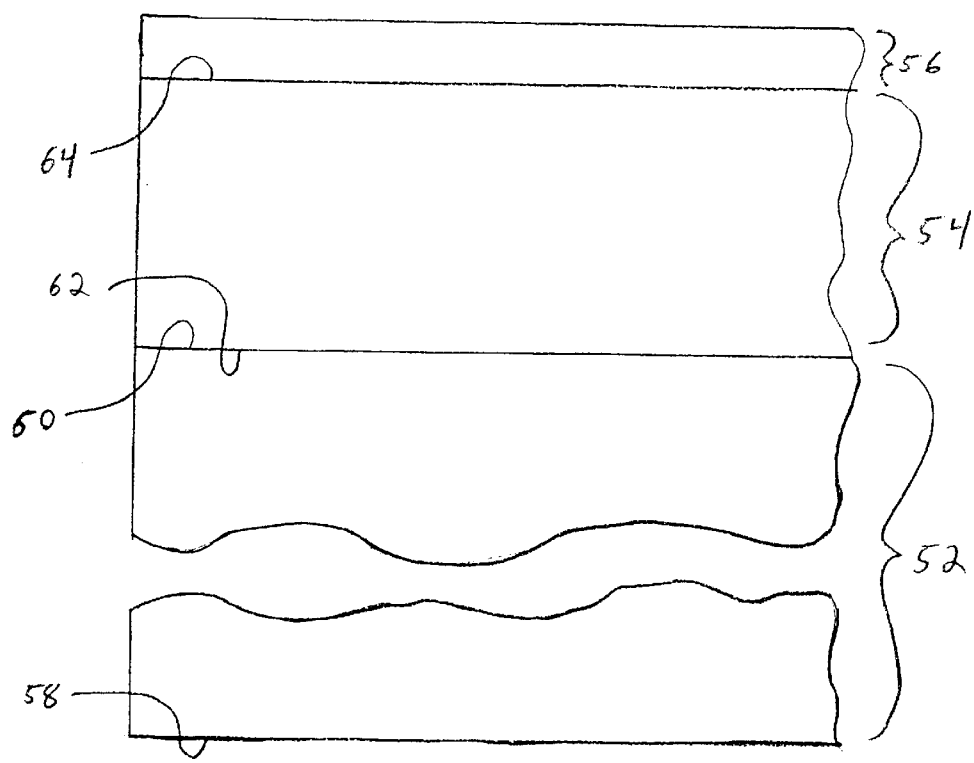

RACING ENGINE HAVING TRIMETAL BEARINGS WITH A THICK OVERLAY FOR HIGH SPEED AND/OR HIGH LOAD APPLICATIONS

This invention claims the benefit of U.S. Provisional Application Ser. No. 60/195,674, filed Apr. 7, 2000. The entire disclosure of U.S. Provisional Application Ser. No. 60/195,674 is incorporated herein by reference.

BACKGROUND OF THE INVENTION

1. Field of the Invention

This invention relates to racing engines and, in particular, to a multi-layer engine bearing having a relatively thick overlay for use in high speed and/or high load applications such as drag racing.

2. Disclosure of Related Art

In designing engine bearings for racing engines or other applications, several considerations must be taken into account. First, the bearings are designed for "conformability"—the ability of the bearing to conform and adapt to the position of the crankshaft in order to account for misalignment of the crankshaft and deflection of the crankshaft and other engine components under heavy loads. This property enables the load to be distributed across a relatively large surface area of the bearing. Second, the bearings are designed for "embedability"—the ability of the bearing surface to absorb particles found within the lubricant that flows between the crankshaft and bearing surfaces. This property prevents excess heat and friction from developing, prevents scoring of the crankshaft and bearing surfaces by the particles, and reduces the likelihood of seizure. Finally, the bearings are also designed to resist "fatigue" (i.e., fracturing of the bearing surface). Resistance to fatigue is dependent upon the bearing having a sufficient tensile strength to enable the configuration of the bearing surface to change without fracturing.

The engine bearings found in conventional drag racing engines are subject to extreme conditions. Conventional drag racing engines are supercharged and fueled by nitromethane and alcohol. The engines operate at very high speeds (about 8,000–10,000 RPM), produce a very high horsepower output (about 8500 HP) and frequently detonate. As a result, the engines are subject to very high loads and the engines experience relatively severe deflection of the engine block, crankshaft, and connecting rods. This deflection creates misalignment between the surfaces of the crankshaft and the engine bearings (including the main bearings in the engine block and the connecting rod bearings). As a result, the outer edges of the bearings become overloaded. Further, the protective oil film between the crankshaft and bearing surfaces breaks down, thereby allowing the crankshaft and bearings to come into contact. The resulting friction and heat often leads to bearing failures.

A variety of bearings have been designed in an attempt to adapt to the extreme conditions found in conventional drag racing engines. One conventional bearing includes a backing layer comprised of steel and a layer of a babbitt metal. The babbitt metals are relatively soft thereby enhancing the conformability and embedability of the bearings. The babbitt metals are also relatively weak, however, and subject to fatigue. The babbitt metals tend to brake up and delaminate from the steel backing layer. The babbitt metals also wear rapidly, thereby allowing the crankshaft to come into contact with the steel backing layer. Finally, the babbitt metals extrude easily under high engine loads.

Another type of bearing found in conventional drag racing engines is the trimetal bearing. A trimetal bearing includes a backing layer comprised of steel, an intermediate layer of a strong bearing material for fatigue strength, and an overlay layer of a soft bearing material (e.g., lead(Pb)-tin(Sn)-copper(Cu)) for conformability and embedability. It is known in the art that improvements in conformability and embedability may be obtained by making the overlay layer thicker. It is also known in the art that improvements in fatigue strength may be obtained by making the overlay layer thinner. In a normal engine (i.e., one that is not subject to the loads imposed on racing engines), the overlay layer is generally about 0.001 inches (0.0254 mm) thick. Bearings having overlays thicker than 0.001 inches (0.0254 mm) are generally restricted to use in engines subject to only relatively light loads (approximately 2800 lbs/in$^2$ (197 kg/cm$^2$) maximum bearing load) where fatigue strength is not a problem. In racing engines, it is generally accepted in the art that the thickness of the overlay layer should be reduced from the normal 0.001 inches (0.0254 mm)—generally to about 0.0005 inches (0.0127 mm)—to improve fatigue strength and the service life of the bearings in the face of the extreme conditions presented in racing engines. This action, however, has reduced the conformability and embedability of the bearings. As a result, assembly and tolerances within the engine must be closely controlled to provide for successful operation of the engine.

There is thus a need for an improved racing engine that will minimize or eliminate one or more of the above-mentioned

SUMMARY OF THE INVENTION

The present invention provides a racing engine having improved engine bearings.

A racing engine in accordance with the present invention includes an engine block and a crankshaft disposed within the engine block. The engine also includes a bearing disposed about the crankshaft. The bearing may comprise a main bearing disposed within a wall of the engine block or a connecting rod bearing disposed within an aperture in a connecting rod. The bearing includes a backing layer, an intermediate layer having a first side adjacent to the backing layer; and an overlay layer disposed on a second side of the intermediate layer. The overlay layer has a thickness of at least about 0.0015 inches or about 38 $\mu$m and, in a preferred embodiment, has a thickness of about 0.002 inches or about 51 $\mu$m. The overlay layer may be comprised of about 5–7% indium by weight with the balance being lead.

A racing engine in accordance with the present invention represents a significant improvement in the art. In contrast to conventional wisdom, the overlay layer in each bearing of the inventive racing engine has been made thicker than the bearings found in a normal engine as opposed to being made thinner as in conventional racing engines. The increased thickness of the bearing overlay within the engine allows the bearing surface to deform under load (conformability) thereby relieving the concentrated edge loading that often leads to bearing failure. At the same time, although the fatigue strength of the bearings—and therefore the life expectancy of the bearings—is reduced relative to conventional thin overlay bearings, the bearings in the inventive engine have been found to have a sufficient fatigue strength to withstand fracturing of the bearing over a desired period of use (which may be as little as 4.5 seconds for a drag racing engine).

These and other features and objects of this invention will become apparent to one skilled in the art from the following detailed description and the accompanying drawings illustrating features of this invention by way of example.

BRIEF DESCRIPTION OF THE DRAWINGS

FIG. 3 is a perspective view of a bearing for an engine in accordance with the present invention.

FIG. 4 is a cross-sectional view of the bearing of FIG. 3 taken substantially along lines 4—4.

DETAILED DESCRIPTION OF THE PREFERRED EMBODIMENT

Figure 1:
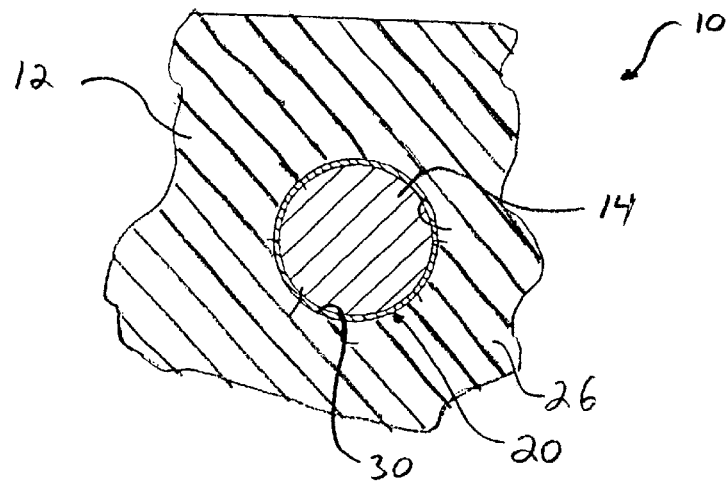
FIGS. 1 and 2 are partial sectional views of an engine in accordance with the present invention
Figure 2:
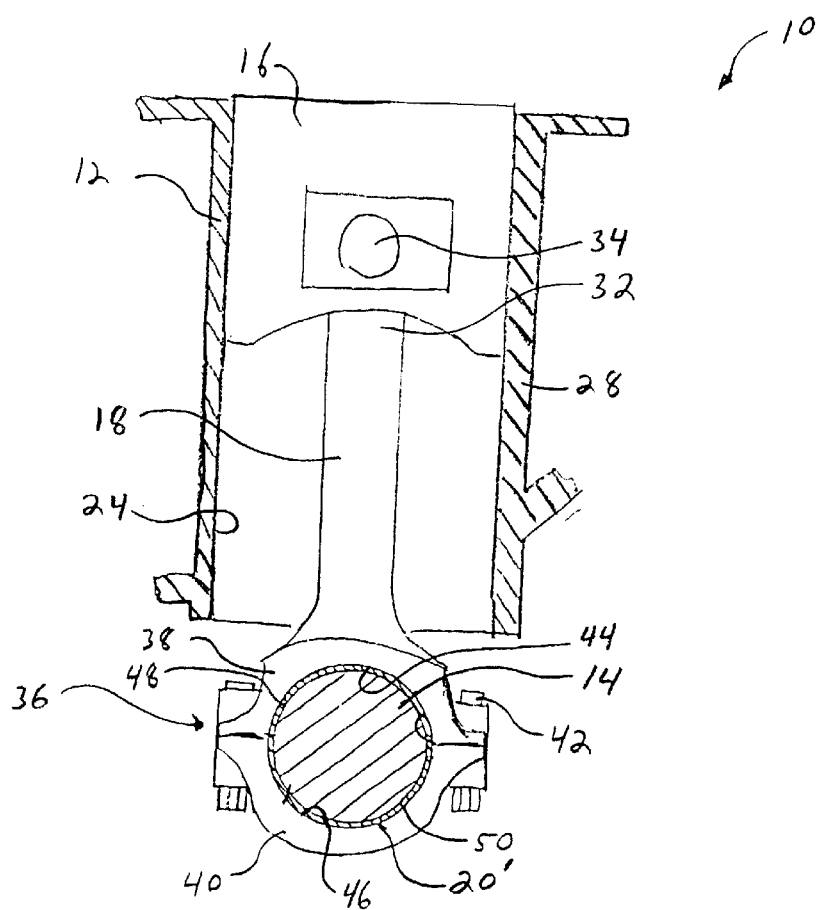

Referring now to the drawings wherein like reference numerals are used to identify identical components in the various views, FIGS. 1 and 2 illustrate portions of a racing engine 10 in accordance with the present invention. Engine 10 may be configured for use in vehicles such as Top Fuel Dragsters and "Funny Cars" used in drag races sanctioned by the National Hot Rod Association (NHRA) and International Hot Rod Association (IHRA). Engine 10 is designed for applications in which the engine operates at a speed of at least 4500 rpm and the engine bearings are subject to a load of at least 6000 lbs/in$^2$ (423 kg/cm$^2$). The drag racing vehicles described above operate at speeds of about 7500–8500 rpm and their engine bearings are subject to loads of about 10000 lbs/in$^2$ (704 kg/cm$^2$). Engine 10 includes an engine block 12, a crankshaft 14, and a plurality of pistons 16 and connecting rods 18. In accordance with the present invention, engine 10 also includes main bearings 20 and connecting rod bearings 20' which may be substantially identical in construction.

Engine block 12 provides structural support for the other components of engine 10 and defines a plurality of cylinders 24 in which combustion of fuel takes place. Block 12 is conventional in the art and supports the remaining components of engine 10. Block 12 includes a plurality of walls including end walls 26 and cylinder walls 28. Each of end walls 26 may include an aperture 30 sized to receive crankshaft 14 and a main bearing 20 disposed about crankshaft 14.

Crankshaft 14 is provided to impart rotary motion within a vehicle in which engine 10 is disposed. Crankshaft 14 is conventional in the art and is disposed within block 12. Crankshaft 14 passes through apertures 30 in end walls 26 of block 12 and may be supported by additional walls within block 12. Crankshaft 14 rotates about an axis. In racing engines such as engine 10, however, crankshaft 14 is subject to severe deflection from its rotational axis.

Pistons 16 define a pressure chamber within cylinders 24 and are conventional in the art. Each piston 16 is disposed within a corresponding cylinder 24 and reciprocates along an axis within cylinder 24 that is generally perpendicular to the rotational axis of crankshaft 14.

Connecting rods 18 are provided to convert the linear motion of pistons 16 into rotary motion of crankshaft 14. Rods 18 are conventional in the art. One end 32 of each rod 18 is connected to a corresponding piston 16 through a pin 34 or other fastener. A second end 36 of each rod 18 is connected to crankshaft 14. End 36 of each rod 18 preferably includes two semicircular halves 38, 40 that are connected together by screws 42 or another fastener. Each half 38, 40 defines a seat 44, 46, respectively, for receiving a corresponding half of a connecting rod bearing 20'.

Bearings 20, 20' perform several functions. First, bearings 20, 20' conform to the alignment of crankshaft 14 so as to absorb any force resulting from misalignment or deflection of crankshaft 14. Second, bearings 20, 20' absorb loose particles such as dirt or metal that may be disposed within the lubricant that flows between crankshaft 14 and bearings 20, 20'. Hereinafter, the construction of bearings 20' will be described in greater detail. It should be understood, however, that bearings 20 have a substantially similar construction.

As illustrated in FIG. 2, each bearing 20' may include an upper half 48 and a lower half 50 configured to be received within seats 44, 46 formed at end 36 of a respective connecting rod 18. Referring now to FIGS. 3 and 4, each bearing 20' includes a backing layer 52, an intermediate layer 54, and an overlay layer 56.

Backing layer 52 provides structural support to bearing 20' and is conventional in the art. Layer 52 is relatively rigid and may be comprised of steel, preferably having a hardness of Rockwell B90 or greater. Layer 52 is arcuate in shape and has a convex outer surface 58 configured to be received in one of seats 44, 46 and a concave inner surface 60 adjacent intermediate layer 54. In the main bearings 20, layer 52 may range from about 0.075 inches to 0.085 inches in thickness. In the connecting rod bearings 20', layer 52 may range from about 0.040 inches to about 0.048 inches in thickness.

Intermediate layer 54 provides fatigue strength for bearing 20' and provides a bearing surface in the event of the removal of overlay layer 56. Layer 54 is conventional in the art. Layer 54 may be comprised of any of a number of conventional metal compositions. In a constructed embodiment, however, layer 54 was comprised of about 72% copper, about 25% lead, and about 3% tin by weight. Layer 54 is arcuate in shape and has a convex outer surface 62 adjacent surface 60 of backing layer 52 and a concave inner surface 64 adjacent overlay layer 56. In the main bearings 20, layer 54 may range from about 0.008 inches to about 0.021 inches in thickness. In the connecting rod bearings 20', layer 54 may range from about 0.007 inches to about 0.020 inches in thickness.

Overlay layer 56 provides several functions. First, layer 56 is provided to conform to the alignment of crankshaft 14 to account for misalignment of crankshaft 14, poor surface finish of crankshaft 14, and, in accordance with the present invention, the severe deflection of crankshaft 14 within drag racing engines such as engine 10. Second, layer 56 is provided to absorb particles such as dirt or metal disposed within the lubricant flowing between crankshaft 14 and bearings 20, 20' to prevent (i) heat and friction from developing, (ii) scoring of the surfaces of crankshaft 14 and bearings 20, 20', and seizure of bearings 20, 20'. Third, layer 56 is provided to prevent fatigue cracks from developing in intermediate layer 54. Overlay layer 56 may be created by a conventional electroplating process. Overlay layer may be comprised of lead-indium. Lead-indium is relatively strong (for fatigue strength), but has good bearing surface properties (such as conformability and embedability). In a constructed embodiment, overlay layer 56 was comprised of about 5–7% indium with the balance being lead. It should be understood, however, that the amount of lead and indium may be varied without departing from the scope of the present invention. Further, the composition of layer 56 may also be varied without departing from the scope of the present invention. In particular, layer 56 may be comprised of a lead-tin-copper composition or even a babbitt metal.

In accordance with the present invention, overlay layer 56 is thicker than the overlay layers for bearings found in normal engines (i.e., those not subject to the extreme conditions of racing engines). In particular, layer 56 has a thickness that ranges from about 0.0015 inches (0.0381 mm) to about 0.0025 inches (0.0635 mm) and, preferably, is about 0.002 inches (0.0508 mm). The thickness of layer 56 means that bearings 20, 20' have been constructed in contrast to the conventional wisdom in the art that layer 56 should be made thinner than the overlay layers of bearings in normal engines. Conventional wisdom teaches that the overlay layer should be made thinner to increase fatigue strength of the bearings. This construction has sacrificed the conformability required in the extreme conditions of racing engines, however. A bearing 20 or 20' in accordance with the present invention includes a thicker overlay 56 which increases the conformability and embedability of bearings 20, 20'. As a result, the inventive bearings 20, 20', are able to deform under extreme loads thereby relieving the concentrated edge loading that often leads to bearing failure and reducing the need for tight control of engine assembly and component tolerances. It has been determined, however, that the inventive bearings 20, 20' also exhibit a sufficient level of fatigue strength to meet the life expectancy of bearings in racing engines such as engine 10. As a result, a racing engine 10 in accordance with the present invention represents a significant improvement over conventional racing engines because the engine includes bearings that are able to meet the conformability requirements required of high speed and high power engines such as the engines used in drag racing.

While the invention has been particularly shown and described with reference to the preferred embodiments thereof, it is well understood by those skilled in the art that various changes and modifications can be made in the invention without departing from the spirit and scope of the invention.

I claim:

1. A drag racing engine, comprising:
   an engine block;
   a crankshaft disposed within said engine block; and,
   a bearing disposed about said crankshaft, said bearing including:
      a backing layer;
      an intermediate layer having a first side adjacent to said backing layer; and,
      an overlay layer disposed on a second side of said intermediate layer, said overlay layer having a thickness of at least 38 μm.

2. The engine of claim 1 wherein said intermediate layer has about 72% copper, about 25% lead, and about 3% tin by weight.

3. The engine of claim 1 wherein said overlay layer has a thickness of about 51 μm.

4. The engine of claim 1 wherein said bearing is disposed within a wall of said engine block.

5. The engine of claim 1 wherein said bearing is disposed within an aperture formed in a connecting rod.

6. A drag racing engine, comprising:
   an engine block;
   a crankshaft disposed within said engine block; and,
   a bearing disposed about said crankshaft, said bearing including:
      a backing layer;
      an intermediate layer having a first side adjacent to said backing layer; and,
      an overlay layer disposed on a second side of said intermediate layer, said overlay layer having a thickness of at least 38 μm, said overlay layer having about 5–7% indium by weight with the remainder being lead.

7. The engine of claim 6 wherein said intermediate layer has about 72% copper, about 25% lead, and about 3% tin by weight.

8. The engine of claim 6 wherein said overlay layer has a thickness of about 51 μm.

9. The engine of claim 6 wherein said bearing is disposed within a wall of said engine block.

10. The engine of claim 6 wherein said bearing is disposed within an aperture formed in a connecting rod.

11. A drag racing engine, comprising:
    an engine block;
    a crankshaft disposed within said engine block; and,
    a bearing disposed about said crankshaft, said bearing including:
       a backing layer;
       an intermediate layer having a first side adjacent to said backing layer; and,
       an overlay layer disposed on a second side of said intermediate layer, said overlay layer having a thickness of about 51 μm
    wherein said engine is configured to operate under at least one of a speed of at least 4500 rpm and a bearing load of at least 6000 psi.

12. The engine of claim 11 wherein said intermediate layer has about 72% copper, about 25% lead, and about 3% tin by weight.

13. The engine of claim 11 wherein said bearing is disposed within a wall of said engine block.

14. The engine of claim 11 wherein said bearing is disposed within an aperture formed in a connecting rod.

* * * * *